US007267153B2

(12) United States Patent
Kohler

(10) Patent No.: US 7,267,153 B2
(45) Date of Patent: Sep. 11, 2007

(54) CORRUGATOR GLUE MACHINE HAVING WEB TENSION NULLING MECHANISM

(76) Inventor: Herbert B Kohler, 10995 Wright Rd. NW., Uniontown, OH (US) 44685

(*) Notice: Subject to any disclaimer, the term of this patent is extended or adjusted under 35 U.S.C. 154(b) by 266 days.

(21) Appl. No.: 11/006,854

(22) Filed: Dec. 8, 2004

(65) Prior Publication Data

US 2005/0194103 A1 Sep. 8, 2005

Related U.S. Application Data

(60) Provisional application No. 60/549,518, filed on Mar. 2, 2004.

(51) Int. Cl.
*B32B 37/00* (2006.01)

(52) U.S. Cl. ...................................... 156/470; 156/494

(58) Field of Classification Search ................ 156/470, 156/494, 495, 538, 555, 582, 205, 210, 229
See application file for complete search history.

(56) References Cited

U.S. PATENT DOCUMENTS

| | | | |
|---|---|---|---|
| 1,981,338 | A | 11/1934 | Swift, Jr. |
| 2,622,558 | A | 12/1952 | Mikkelsen |
| 3,026,231 | A | 3/1962 | Chavannes |
| 3,046,935 | A | 7/1962 | Wilson |
| 3,300,359 | A | 1/1967 | Nikkel |
| 3,306,805 | A | 2/1967 | Klein et al. |
| 3,560,310 | A | 2/1971 | Bolton |
| 3,648,913 | A | 3/1972 | Ferara |
| 3,788,515 | A | 1/1974 | Middleman |
| 4,177,102 | A | 12/1979 | Tokuno |
| 4,267,008 | A | 5/1981 | Owens |
| 4,306,932 | A | 12/1981 | Bradatsch et al. |
| 4,316,428 | A | 2/1982 | Flaum et al. |
| 4,316,755 | A | 2/1982 | Flaum et al. |
| 4,338,154 | A | 7/1982 | Berthelot et al. |
| 4,344,379 | A | 8/1982 | Roberts |
| 4,351,264 | A | 9/1982 | Flaum et al. |
| 4,453,465 | A | 6/1984 | Heller et al. |
| 4,589,944 | A | 5/1986 | Torti et al. |
| 4,603,654 | A | 8/1986 | Mori et al. |
| 4,757,782 | A | 7/1988 | Pullinen |
| 4,764,236 | A | 8/1988 | Nikkel |
| 4,841,317 | A | 6/1989 | Westell |
| 4,863,087 | A | 9/1989 | Kohler |

(Continued)

FOREIGN PATENT DOCUMENTS

| | | |
|---|---|---|
| CA | 1072873 | 3/1980 |

(Continued)

OTHER PUBLICATIONS

E. Daub et al., Gluing Corrugating Medium and Linerboard Together on the Corrugator, pp. 171-178, Tappi Journal, Jun. 1990.

*Primary Examiner*—James Sells
(74) *Attorney, Agent, or Firm*—Pearne & Gordon LLP

(57) ABSTRACT

A corrugator glue machine is provided having a web tension nulling mechanism that is effective to cancel out web tension-effect forces exerted on machine members, such as rollers, so these forces to not substantially interfere with the application of glue to the exposed flute crests of a single-faced corrugated web in the glue machine.

17 Claims, 5 Drawing Sheets

U.S. PATENT DOCUMENTS

| | | | | |
|---|---|---|---|---|
| 4,886,563 | A | 12/1989 | Bennett et al. | |
| 4,935,082 | A | 6/1990 | Bennett et al. | |
| 4,991,787 | A | 2/1991 | Berg | |
| 5,016,801 | A | 5/1991 | Gilat et al. | |
| 5,037,665 | A | 8/1991 | LaMantia et al. | |
| 5,048,453 | A | 9/1991 | Eriksson | |
| 5,103,732 | A | 4/1992 | Wells et al. | |
| 5,203,935 | A * | 4/1993 | May et al. | 156/64 |
| 5,226,577 | A | 7/1993 | Kohler | |
| 5,242,525 | A | 9/1993 | Biagiotti | |
| 5,275,657 | A | 1/1994 | Duffy et al. | |
| 5,362,346 | A | 11/1994 | Bullock, Sr. | |
| 5,503,547 | A | 4/1996 | Funahashi et al. | |
| 5,508,083 | A | 4/1996 | Chapman, Jr. | |
| 6,051,068 | A | 4/2000 | Kohl et al. | |
| 6,058,844 | A | 5/2000 | Niemiec | |
| 6,068,701 | A | 5/2000 | Kohler et al. | |
| 6,126,750 | A | 10/2000 | Seiz et al. | |
| 6,136,417 | A | 10/2000 | Ishibuchi et al. | |
| 6,418,851 | B1 | 7/2002 | Hartmann et al. | |
| 6,575,399 | B1 | 6/2003 | Lamothe | |
| 6,595,465 | B2 | 7/2003 | Lamothe | |
| 6,602,546 | B1 | 8/2003 | Kohler | |
| 6,635,111 | B1 | 10/2003 | Holtmann et al. | |
| 2003/0178524 | A1 | 9/2003 | Newman et al. | |

FOREIGN PATENT DOCUMENTS

| | | |
|---|---|---|
| EP | 0037332 | 10/1981 |

* cited by examiner

CORRUGATOR GLUE MACHINE HAVING WEB TENSION NULLING MECHANISM

This application claims the benefit of U.S. Provisional Patent Application Ser. No. 60/549,518 filed Mar. 2, 2004.

BACKGROUND OF THE INVENTION

Field of the Invention

The present invention relates to a web tension nulling mechanism for a traveling web. More particularly, it relates to such a mechanism in a corrugator glue machine, so the position and alignment of the traveling web with respect to a glue applicator roll in the machine can be very precisely controlled independently of the tension, or of tension changes, in the traveling web.

Corrugated cardboard composite is used in a large number of applications. It is particularly desirable in packaging applications because it is rugged and has high dimensional and structural integrity.

A corrugated cardboard composite generally consists of first- and second-face sheets of cardboard material having a relatively flat or smooth contour, and a corrugated sheet sandwiched in between the first- and second-face sheets with the flute crests on each side of the corrugated sheet glued to the adjacent face sheet. This composite typically is made by first gluing (the flute crests on) one side of the corrugated sheet to the first-face sheet to provide a single-faced corrugated sheet or web via known or conventional techniques. This single-faced corrugated web then is fed to a corrugator glue machine, where glue is applied to the exposed flute crests of the corrugated sheet, opposite the first-face sheet, in order subsequently to bond the second-face sheet thereto, thus creating the sandwich construction described above.

To carry out this method, a conventional corrugator glue machine has been used for applying glue to exposed flute crests opposite the first-face sheet. Such a conventional glue machine is shown in FIG. 1, denoted "Prior Art." In the conventional glue machine, labeled 10' in FIG. 1, the traveling single-faced corrugated web 5 approaches the glue machine 10' toward a delivery idler roller 12'. In operation, the traveling web 5 is carried around this roller 12' and is delivered via a generally serpentine path to and around a web positioning roller 14', such that the web 5 passes around the roller 14' and through a gap 18' between the web positioning roller 14' and a glue applicator roller 16'. The web 5 is conveyed through this gap 18' oriented such that the exposed flute crests 6 face the glue applicator roller 16' so that glue can be applied thereto by contacting a thin glue film 4 on the outer circumferential surface of the glue applicator roll 16' as the web 5 traverses the gap 18'. The glue film is applied to the outer surface of the applicator roller by conventional means or as described, e.g., in U.S. Pat. No. 6,602,546, which is incorporated herein by reference. Other aspects of glue application to the exposed flute crests of the single-faced web are described, e.g., in U.S. Pat. No. 6,602,546 incorporated hereinabove. For purposes of the present invention, it will be sufficient to note that the application of glue to the exposed flute crests 6 requires the gap 18', and therefore the distance between the outer circumferential surfaces of the respective glue applicator roller 16' and the web positioning roller 14', to be precisely controlled to ensure the crests 6 contact the glue film 4 on the surface of the applicator roller 16' with the appropriate amount of pressure. Too much pressure can result in crushing the flutes, and too little can result in insufficient glue application or in no glue application at all.

In the conventional glue machine 10' shown in FIG. 1, both the delivery idler roller 12' and the web positioning roller 14' are pivotally mounted to the same support arm 20', which is pivotally attached at its proximal end to a base member 40' of the glue machine at pivot joint 22'. The reason for the pivotal attachment of the support arm 20' is to permit the position of the positioning roller 14' to be adjusted relative to the applicator roller 16' in order to adjust the gap 18' width. It will be noted that conventionally, except for axial rotation, the rollers 12' and 14' cannot move relative to one another. It also will be noted the rotational axis of the delivery idler roller 12' is located a greater distance from the pivot joint 22' than that of the positioning roller 14', the significance of which will be explained below.

A pressure controller 50' is mounted to the glue machine and is operatively coupled to the support arm 20' to actuate the arm 20' for regulating the width of the gap 18'. In this manner, the controller 50' is responsible for regulating the pressure with which flutes 6 are compressed against the applicator roller 16' by the positioning roller 14'. A significant problem in this conventional construction is that the tension of the traveling web 5 causes unequal and oppositely acting moments $M_1$ and $M_2$ at the delivery idler roller 12' and the positioning roller 14', respectively, to act on the support arm 20' which is pivoted from a base member 40' of the glue machine. The reason that moments $M_1$ and $M_2$ are unequal is that while each is the result of substantially the same net force (due to web tension), the respective lever arm lengths for each moment, measured from the pivot point of the support arm 20' (pivot joint 22') to the point of action of the respective moment (rotational axes of the rollers 12' and 14'), are different. The vector sum of these unequal moments, $M_1$ and $M_2$, is a net effective moment $M_3$ acting in the direction of the moment $M_1$, which tends to pivot the support arm 20', and therefore the positioning roller 14', toward the applicator roller 16'.

As a result, the pressure controller 50' must compensate for this pivot force on the positioning roller 14' based on the tension in web 5 in addition to regulating the gap width to achieve optimal glue application to the flute crests 6. This is a substantial burden on the pressure controller 50' in the conventional glue machine. In addition, if there is a sudden or unpredictable change in the tension of the traveling web 5, the pressure controller 50' may not react quickly enough to compensate for the resulting change in the tension-based pivot force on the positioning roller 14'. The pressure controller 50' also can over- or under-compensate which can result in substantial stretches of the single-faced corrugated web having too much or too little glue applied to the flutes 6, or otherwise having the flutes 6 substantially crushed. These stretches of the web are unusable or unsaleable for the intended purpose, and contribute to substantial material waste, lost profits and/or increased price to the consumer.

Alternatively, in conventional glue machines 10' the positioning roller 14' sometimes is maintained in a fixed absolute position during operation by biasing the support arm 20' toward the applicator roller 16' against one or a series of hard stops using an excessive pressure or force such that web tension (or tension changes) are insufficient to counteract the biasing force and divert the fixed position of the roller 14'.

This design is limited in that neither the width of the gap 18' nor the pressure exerted by the roller 14' on the flute crests 6 against the applicator roller 16' can be metered or controlled during machine operation, but are fixed.

There is a need in the art for a mechanism or method of nulling the tension effects in the traveling single-faced web 5, so that changes in the web tension do not effect the operation of a corrugator glue machine. Most preferably, such a mechanism or method not only will compensate out changes in the web tension, but also will compensate out the baseline or constant tension in the traveling web, so the glue machine does not need to actively compensate or account for web tension regardless of whether the tension is constant or changing.

SUMMARY OF THE INVENTION

A corrugator glue machine is provided having an idler roller and a web positioning roller that cooperate to at least partially define a serpentine web path through the machine. A position of the positioning roller is freely adjustable within a predetermined range during operation of the machine. The glue machine further includes a web tension nulling mechanism effective to cancel out forces exerted on the web positioning roller resulting from tension in the web, such that these forces do not substantially affect the position of the positioning roller within the predetermined range.

A corrugator glue machine also is provided having a web positioning roller for carrying a web of material over its circumferential outer surface during operation of the machine, means for adjusting the position of the web positioning roller during operation of the machine, and a web tension nulling mechanism effective to cancel out forces exerted on the web positioning roller resulting from tension in the web, such that the adjusting means experience substantially no forces resulting from web tension.

A corrugator glue machine also is provided having a web positioning roller for carrying a web of material over its circumferential outer surface during operation of the machine, a glue applicator roller parallel to the web positioning roller and adapted to be provided with a glue film on its circumferential outer surface during operation of the machine, wherein the positioning and glue applicator rollers define a gap between their respective circumferential outer surfaces. Means also are provided for adjusting the width of the gap during operation of the machine. The machine is configured such that the gap width adjusting means experience substantially no forces resulting from web tension during operation of the machine.

DETAILED DESCRIPTION OF PREFERRED EMBODIMENTS OF THE INVENTION

Herein, all machine elements or members, such as support arms 20*a* and 20*b*, cross member 25, etc., are considered to be rigid, substantially inelastic elements or members under the forces encountered by them in the described corrugator glue machine. All such elements or members can be made using conventional materials in a conventional manner as will be apparent to persons of ordinary skill in the art based on the present disclosure.

Figure 1:
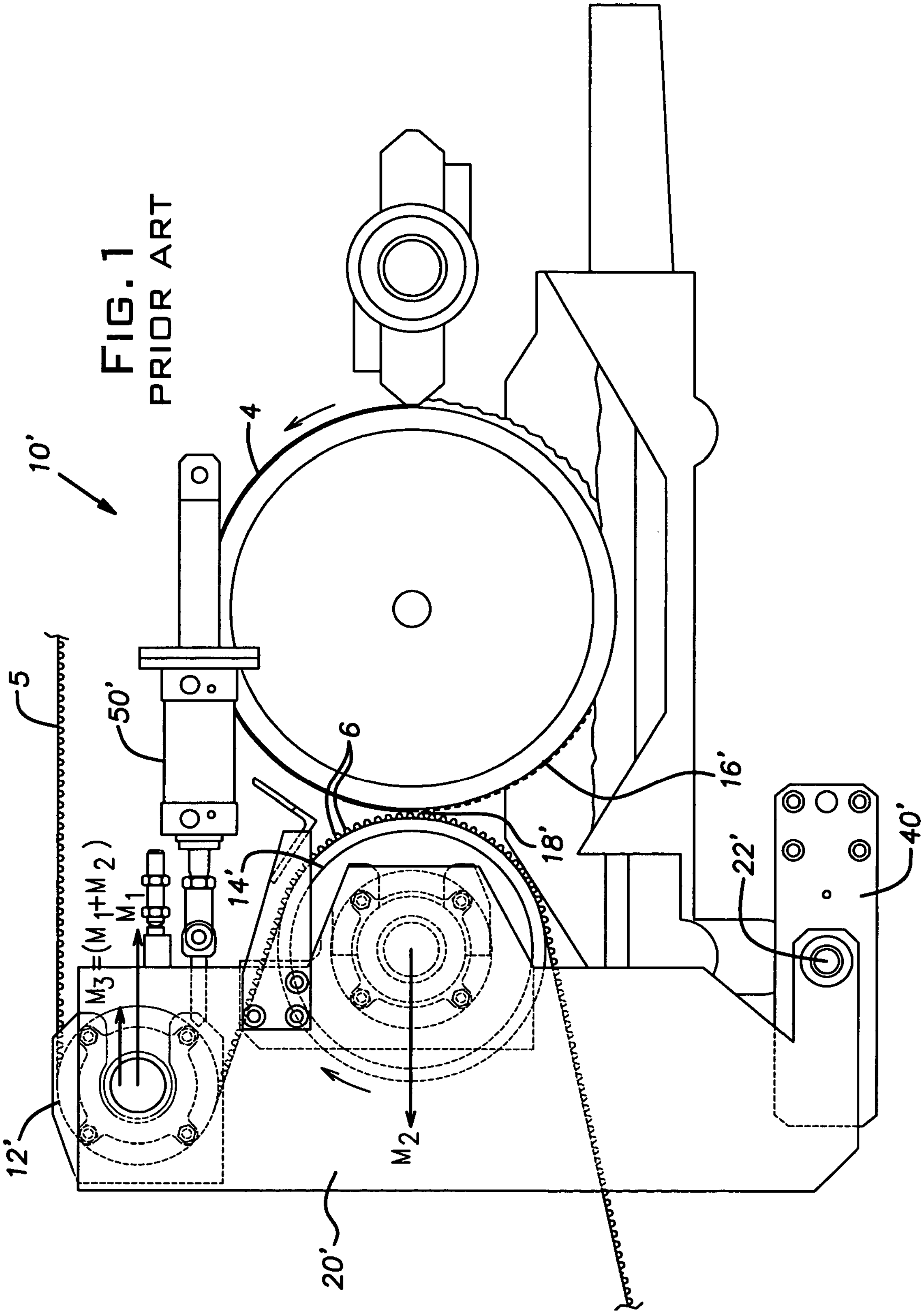
FIG. 1 PRIOR ART
FIG. 1, labeled "Prior Art," shows a side view of conventional corrugator glue machine.
Figure 2:
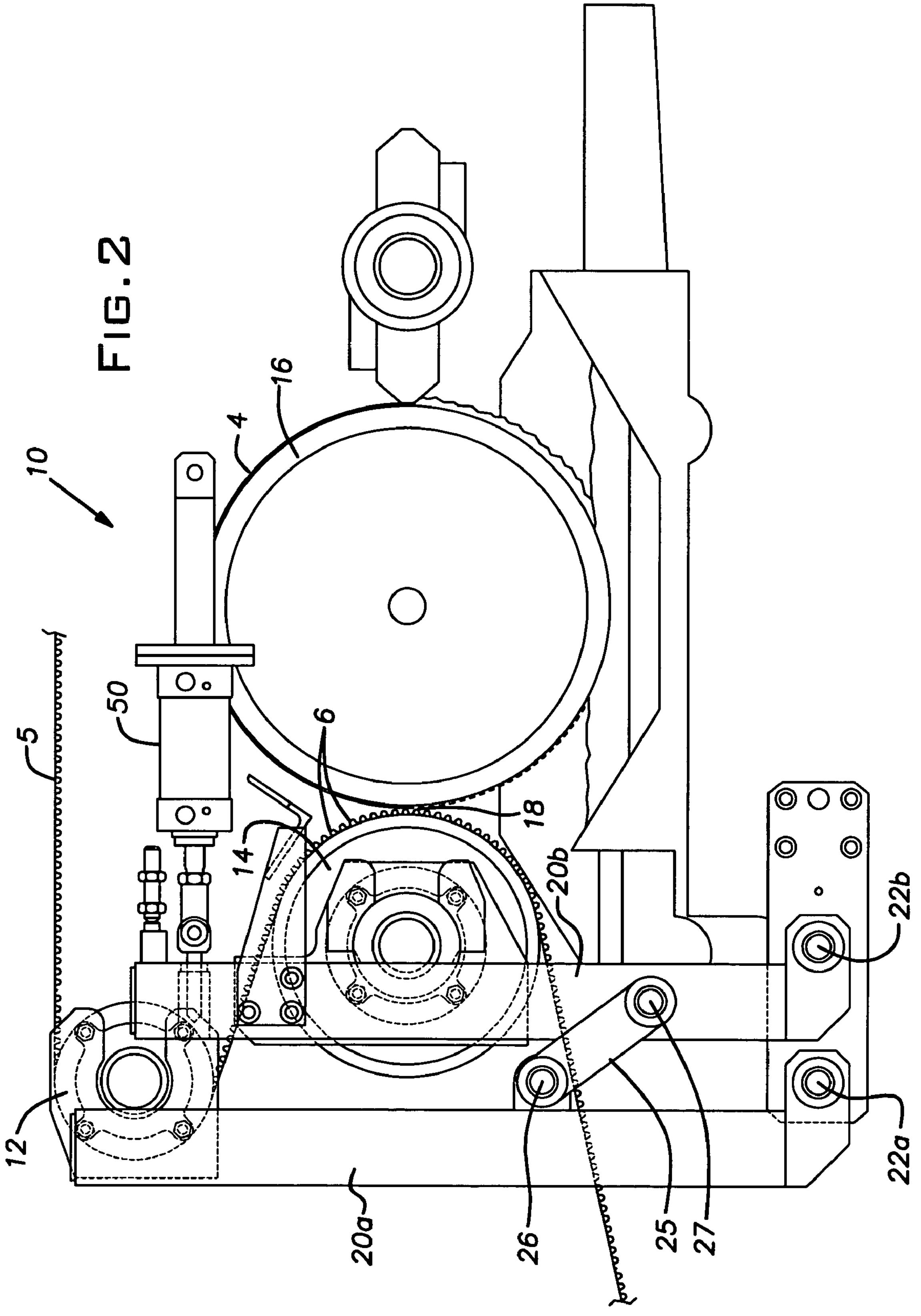
FIG. 2 shows a side view of a corrugator glue machine according to a first embodiment of the invention.

Referring now to FIG. 2, a first embodiment of a corrugator glue machine is shown, incorporating a web tension nulling mechanism according to the invention. The glue machine 10 includes a delivery idler roller 12, a web positioning roller 14 and a glue applicator roller 16 substantially similar in placement as the corresponding rollers described above. In operation, the web 5 is conveyed toward and around the delivery idler roller 12, then toward and around the web positioning roller 14 in a generally serpentine path such that, on traversing the gap 18, the web 5 is oriented having its flutes facing the glue applicator roller 16 and is pressed up against the outer circumferential surface of that roller 16 to achieve the desired level of glue application onto the exposed flute crests 6 of the passing web 5.

Still referring to FIG. 2, the delivery idler roller 12 is rotationally attached to a first support arm 20*a* whose proximal end is pivotally attached to a base 40 of the glue machine 10 (or to rigidly connected members which together comprise a base for the glue machine) at support pivot joint 22*a*. The web positioning roller is rotationally attached to a second support arm 20*b*, whose proximal end is pivotally attached to the base 40 of the glue machine 10 at a second support pivot joint 22*b*. Each of the support arms 20*a* and 20*b* is independently pivotable relative to the base 40 of the glue machine about its own respective support pivot axis defined at its respective pivot joint. In an exemplary embodiment, each of the support pivot joints 22*a* and 22*b* is located or vertically aligned substantially beneath the center of gravity (axis of rotation) of the respective roller 12, 14 during operation of the glue machine, so the roller masses do not induce significant moments about the pivot joints in their respective support arms 20*a*, 20*b* which must be compensated for by the pressure controller 50 (described below). Alternatively, each of the support arms 20*a* and 20*b* can be pivotally attached at its proximal end at the same pivot joint (e.g. on the same shaft) or at coaxially aligned pivot joints, so long as the support arms 20*a* and 20*b* remain independently pivotable relative to one another (except as a result of the cross member 25, described below).

A cross member 25 is provided extending transversely of, and linking the first and second support arms 20*a* and 20*b* as described in this paragraph. The cross member 25 is pivotally attached at its first end to the first support arm 20*a* at a first linking pivot joint 26, and at its second end to the second support arm 20*b* at a second linking pivot joint 27. Thus, the cross member 25 is freely pivotable relative to each of the first and second support arms 20*a* and 20*b* at the respective linking pivot joint 26,27, and but for its attachment to the other support arm at its opposite end, the cross member 25 would be free to rotate about each of the linking pivot joints at each support arm. The geometry of the cross member 25 is selected based on the locations of the rotational axes of the idler and positioning rollers 12 and 14 relative to their respective support pivot joints 22*a* and 22*b* so that the greater moment generated at the idler roller 12, compared to that generated at the positioning roller 14, from web tension is mechanically balanced out to achieve equilibrium in both support arms based on web tension-induced forces.

Figure 2A:
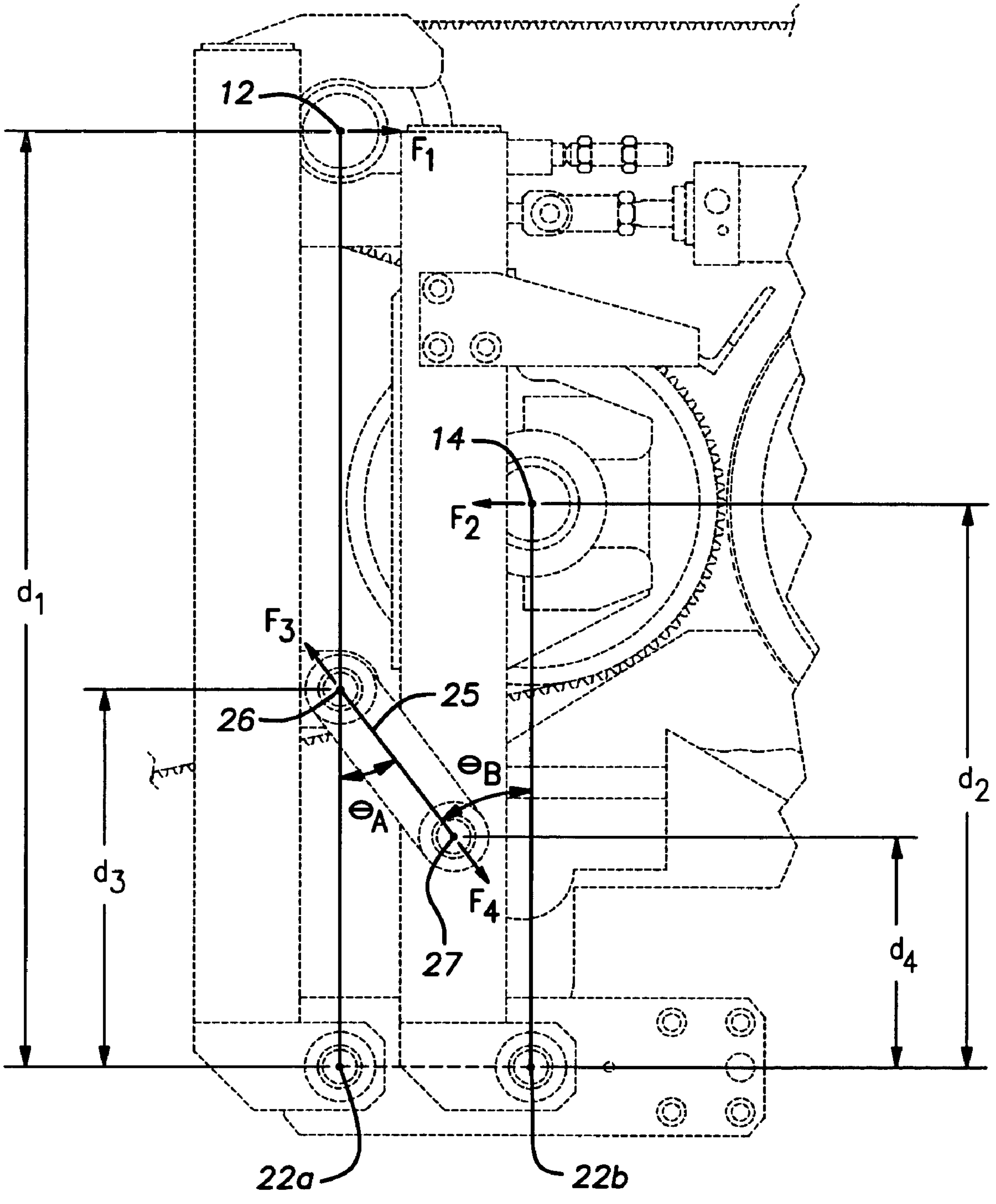
FIG. 2*a* is a force-member diagram of certain members of the corrugator glue machine of FIG. 2 superimposed over the corresponding members from FIG. 2, shown during operation thereof.

Referring now to FIG. 2*a*, a force-member diagram is shown depicting the forces acting on the above-described mechanical system resulting from web tension as the web 5 follows the serpentine path around the idler and positioning rollers 12 and 14. Represented in FIG. 2*a* are the first and second support arms 20*a* and 20*b*, the cross member 25 and the rollers 12 and 14, as well as the first and second pivot joints 22*a* and 22*b*, and the first and second linking pivot joints 26 and 27. To balance out the moments generated by forces $F_1$ and $F_2$ (caused by web tension) in FIG. 2*a*, the points of attachment of the cross member 25 to the support arms (locations of first and second linking pivot joints 26 and 27) are selected so as to compensate out the relative mechanical advantage of the first support arm 20*a* over the second support arm 20*b* based on its longer lever arm length.

The following variables used in FIG. 2*a* are defined:

$d_1$=distance from first pivot joint 22*a* to the axis of idler roller 12;

$d_2$=distance from second pivot joint 22*b* to the axis of positioning roller 14;

$d_3$=distance from first pivot joint 22*a* to first linking pivot joint 26;

$d_4$=distance from second pivot joint 22*b* to second linking pivot joint 27;

$F_1$=the force on the idler roller 12 based on web tension, which acts horizontally based on the web path;

$F_2$=the force on the positioning roller 14 based on web tension, which acts horizontally based on the web path, $F_3$=the compressive force exerted by the cross member 25 on the first support arm 20*a* during operation;

$F_4$=the compressive force exerted by the cross member 25 on the second support arm 20*b* during operation;

$\theta_A$=the acute angle defined between the cross member 25 and the distance $d_1$;

$\theta_B$=the acute angle defined between the cross member 25 and the distance $d_2$;

α=the interior angle between distance $d_i$ and the horizon; and

β=the interior angle between the distance $d_2$ and the horizon.

At equilibrium, the sum of the moments in each of the support arms 20*a* and 20*b* must equal zero. When the rollers 12 and 14 are vertically aligned over their respective support pivot joints 22*a* and 22*b* as described above, the distances $d_1$ and $d_2$ both are substantially vertical and parallel, making angles a and b both about 90°, and angles $\theta_A$ and $\theta_B$ congruent angles. Thus, for the first support arm 20*a* this gives:

$$\Sigma M_{ARM\ 20a}=0=F_1d_1-F_3d_3 \quad \text{Eq. 1:}$$

For the second support arm 20*b*:

$$\Sigma M_{ARM\ 20b}=0=F_2d_2-F_4d_4 \quad \text{Eq. 2}$$

The magnitudes of the forces $F_1$ and $F_2$ are equal because they are based on the same web tension. Also, during operation the cross member 25 is in compression due to the oppositely acting forces $F_1$ and $F_2$ tending to compress the first and second support arms 20*a* and 20*b* together, and at equilibrium the magnitudes of forces $F_3$ and $F_4$ in the cross member 25 must be equal. These relations give the following additional two equations at equilibrium:

| | |
|---|---|
| Eq. 3: | $F_1 = F_2$ |
| Eq. 4: | $F_3 = F_4$ |

Substituting Eqs. 3 and 4 into Eq. 1 gives:

$$F_2d_1=F_4d_3 \quad \text{Eq. 5:}$$

Substituting Eq. 2 into Eq. 5 gives:

$$F_4(d_4/d_2)d_1=F_4d_3 \quad \text{Eq. 6:}$$

Canceling the $F_4$ terms and rearranging gives:

$$(d_4/d_2)=(d_3/d_1) \quad \text{Eq. 7:}$$

In Eq. 7 above, all the force terms cancel out, and an equilibrium condition is achieved according to the invention for the support arms 20*a* and 20*b*, regardless of the web tension 5, so long as Eq. 7 is satisfied.

It is desirable that each of the rollers 12 and 14 be oriented such that, when the glue machine is operating 10, each roller's rotational axis is vertically aligned over the respective support pivot joint 22*a* or 22*b*, in order to avoid any roller mass-based moments being generated in either of the support arms 20*a* or 20*b*. If, for some reason, it is found to be desirable or necessary in a particular application to orient one or both of the rollers in a different geometry, then obviously the resulting mass-based moment in the affected support arm(s) will need to be taken into consideration. In addition, if the distances $d_1$ and $d_2$ are not oriented parallel, then the angles α and β will not both be 90° and angles $\theta_A$ and $\theta_B$ will not necessarily be congruent. In this case, one will need to calculate the normal force components for each of the forces $F_1$-$F_4$ relative to the respective distance $d_1$ or $d_2$, and use these normal force component values to solve an analogous system of equations as above to determine the appropriate geometry for the cross member 25 in a particular installation. Such trigonometric calculations can be performed by the person of ordinary skill in the art for a given system without undue experimentation.

It will be understood to those of ordinary skill in the art that each of the distances $d_1$-$d_4$ referred to above is to be measured as the linear distance between the respectively defined points, and not necessarily as the length of any actual member. For example, $d_1$ is the linear distance between the first pivot joint 22*a* (pivot axis) and the axis of rotation of the delivery idler roller 12; $d_2$ is the linear distance between the second pivot joint 22*b* (pivot axis) and the axis of rotation of the web positioning roller 14; $d_3$ is the linear distance between the axes of the first pivot joint 22*a* and the first linking pivot joint 26; and $d_4$ is the linear distance between the axes of the second pivot joint 22*b* and the second linking pivot joint 27. This is so regardless of the actual path or shape of the respective first and second support arms 20*a* and 20*b* which may be straight or curved members. Also herein, when referring to the arms 20*a* and 20*b* as being parallel or substantially parallel, it will be understood that what is being referred to are imaginary lines drawn along the respective distances $d_1$ for the first support arm 20*a* and $d_2$ for the second support arm 20*b*. Where the support arms 20*a* and 20*b* are straight members, these imaginary lines will become substantially colinear with their support arms, and the distinction between the actual support arm and the respective linear distance between two points on that arm will be diminished. However, if the support arms are to be curved members, then parallelism of the support arms, as well as the angles $\theta_A$ and $\theta_B$, must be measured relative to the linear distances $d_1$ and $d_2$ respectively, as they are described in this paragraph.

It is noted once again that all of the actual force terms ($F_1$-$F_4$) drop out of Eq. 7 above. As a result, not only is the mechanism according to the invention effective to null out web tension effects based on a constant tension in the web 5, but also changes, even unexpected or sudden changes, in web tension due to factors external to the glue machine 10 do not compromise or substantially compromise the equilibrium (based on web tension effects) established by cross member 25 between the first and second support arms 20*a* and 20*b* in the glue machine for supporting the idler and positioning rollers 12 and 14. Consequently, the absolute position of the positioning roller 14 need not be fixed during operation of the machine 10 in order to prevent its being acted on by web tension-induced forces or moments, and, according to the invention, the roller 14 is permitted to float freely within a predetermined range in an arc about its support pivot joint 22*b* during operation of the glue machine. Thus, the roller 14 is freely adjustable within this predetermined range during operation of the glue machine.

Figure 4:
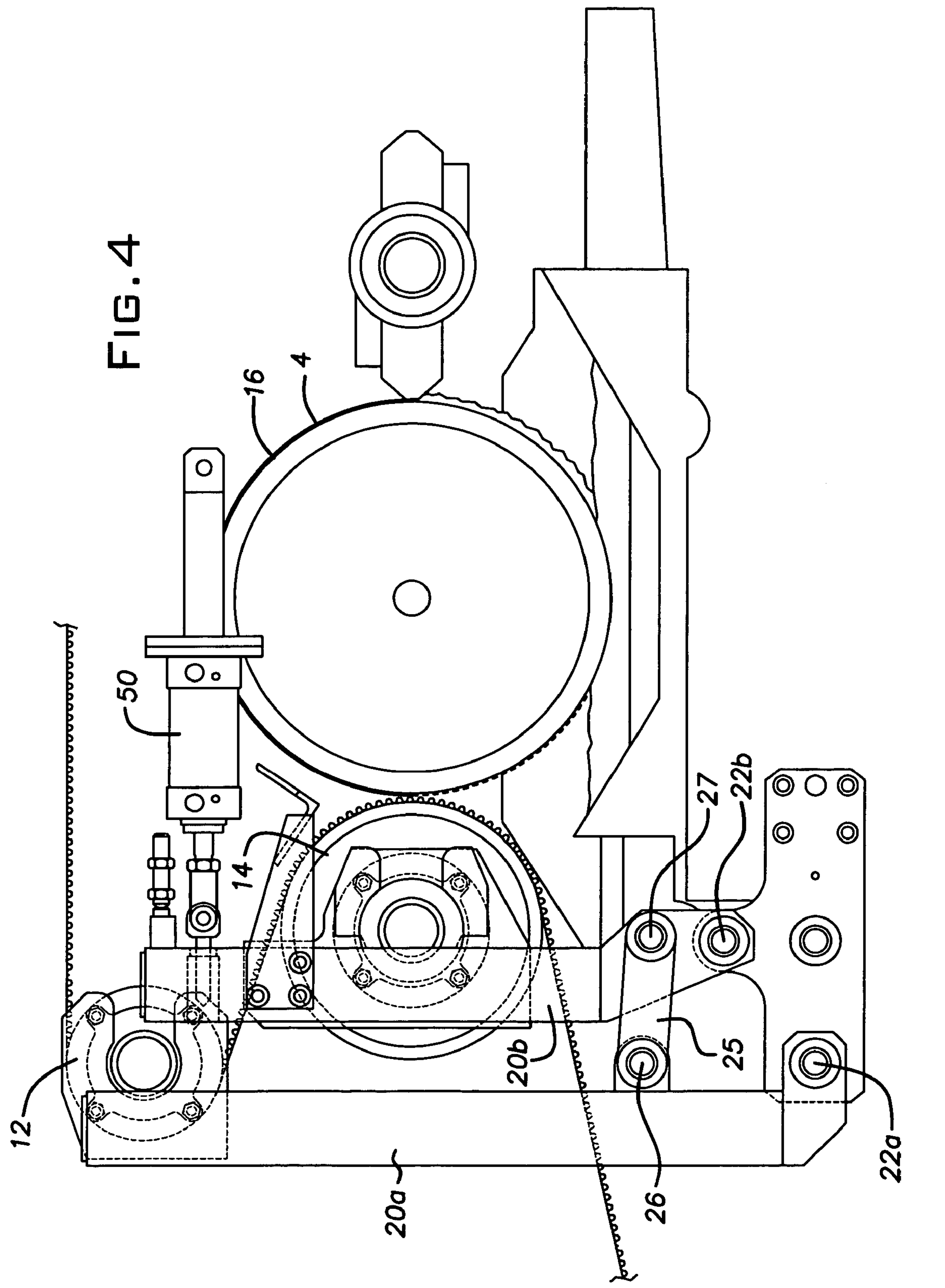
FIG. 4 shows a side view of a corrugator glue machine according to a second embodiment of the invention.

A pressure or gap metering controller 50 is coupled to the second support arm 20*b* as shown in FIGS. 2 and 4, which otherwise is freely adjustable during machine operation as described in the preceding paragraph. The controller 50 is capable of precisely metering the width of the gap 18 between the positioning and applicator rollers 14 and 16, and/or the pressure exerted by the roller 14 on the flutes against the applicator roller 16 to achieve optimal glue application to the passing flute crests 6. The pressure controller 50 does not have to compensate or account for tension in the web 5, nor is its operation or the precise metering of gap 18 substantially disturbed or affected due to even significant sudden or unpredictable changes in web tension. This presents several significant advantages over conventional glue machines. First, the pressure controller 50 can incorporate very high precision motors, servos, pneumatic cylinders, or the like, or suitable combinations of these or other conventional mechanical or pneumatic or hydraulic metering devices, to achieve very high precision metering of the position of roller 14 as well as the pressure exerted thereby on the web 5 against the applicator roller 16, to provide precise dynamic gap metering control for a wide range of different flute sizes (e.g., sizes A through E or smaller) to achieve optimal glue-to-flute application. Conventionally, very high precision metering components for the controller 50 were problematic due to relatively large web tension-effect forces, as well as sudden significant changes in such forces, that the controller 50 had to withstand and compensate for. Because these large magnitude forces have been mechanically nulled or compensated out according to the invention, higher precision and more sensitive metering devices can be used in the pressure controller 50 than were previously possible, and a machine according to the invention provides very precise dynamic gap metering control independent of web tension effects.

Second, large stretches of unusable web material associated with over- or under-compensation of the pressure controller 50 due to sudden or unexpected changes in web tension are substantially eliminated, because such changes no longer substantially affect or induce net forces exerted on the positioning roller 14 or the controller 50. Optionally, the pressure controller 50 can be coupled to the first support arm 20*a* in order to regulate the width of the gap 18, though this is less preferred.

Those of ordinary skill in the art will appreciate that when the rotational axes of the idler and positioning rollers 12 and 14 are aligned directly over their respective support pivot joints 22*a* and 22*b* in respective vertical planes, the masses of these rollers contribute zero moment to the support arms 20*a* and 20*b* that must be accounted for by the controller 50. However, during operation it is recognized that to the extent the positioning roller 14, and therefore also the idler roller 12 (assuming the distances $d_1$ and $d_2$ to be parallel), are adjusted to a position outside of its respective vertical plane with the associated support pivot joint 22*a*,22*b*, then the controller 50 will need to account for the resulting moments induced in the support arms 20*a* and 20*b* in order to counteract their effect on the desired position of the roller 14. This does not introduce a significant challenge to the design of the controller 50 because the resulting moments, and more importantly the force necessary to counteract them, are known or derivable functions of the position of the positioning roller 14 based on the masses of the rollers 12,14 and the geometry of the system, all of which are known variables for a given machine 10. The nulling mechanism according to the invention as illustrated, e.g., in the disclosed embodiments, is effective to counteract or substantially null out forces and moments exerted on machine members (such as rollers 12,14, and support arms 20*a*,20*b*) resulting from tension in the traveling web 5, so these forces do not affect the position of the roller 14 within the predetermined range described above. With these forces canceled out, the controller 50 can provide effective metering of the gap 18 during operation of the glue machine 10 that takes into account and compensates against the predictable forces resulting from roller-mass induced moments based on the relative position of the positioning roller 14 within the predetermined range.

That predetermined range may vary based on the machine and its particular application, but generally will be broad enough to accommodate a wide range of flute sizes, as well as a broad range of compression rates for each flute size that is to be compatible with the glue machine. The predetermined range can be, for example, an arc length of up to at least 1, 2, 3, 4, 5, 6, 7, 8, 9 or 10, inches, with the controller 50 capable to maintain precise dynamic gap metering control within such range.

Figure 3:
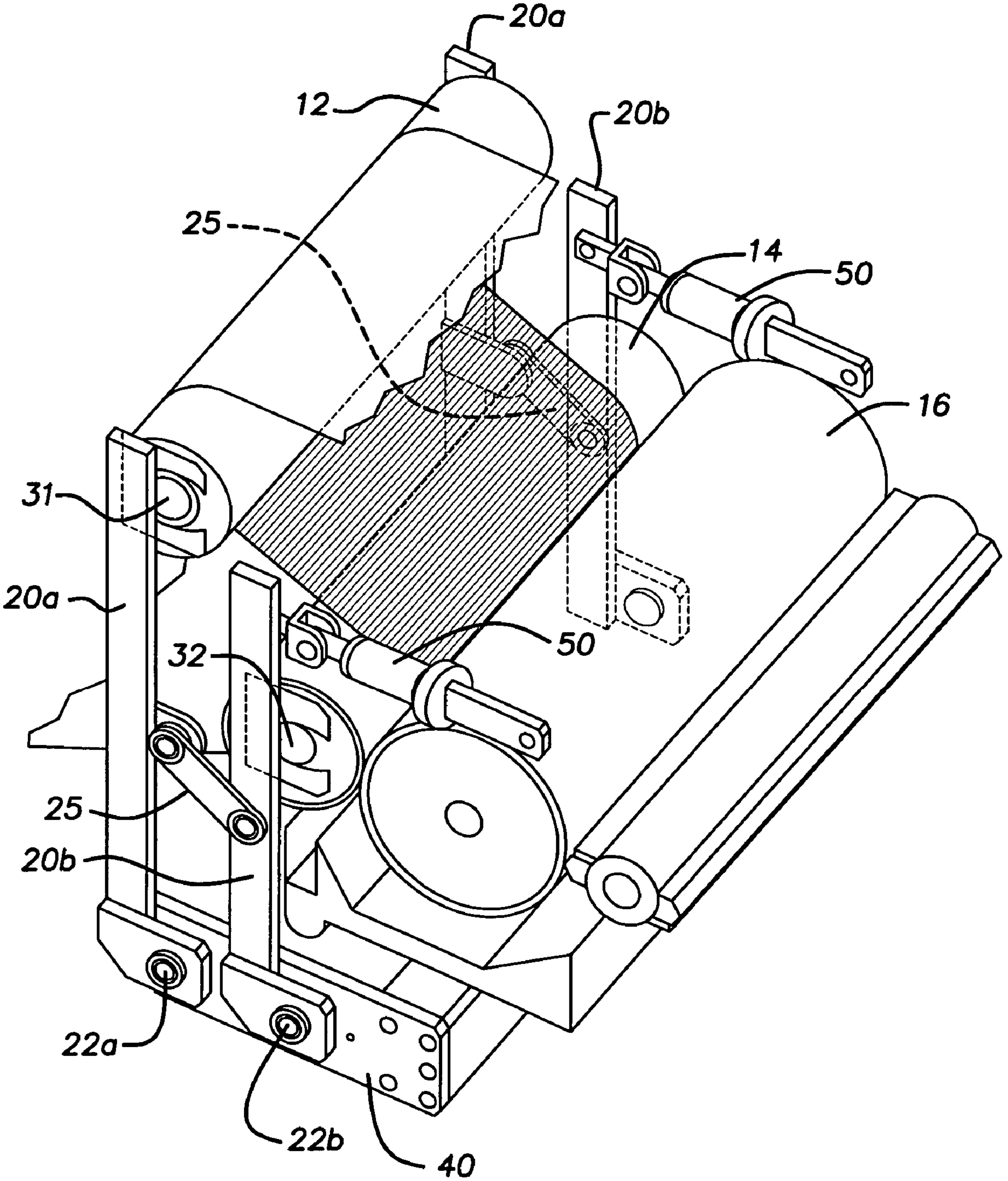
FIG. 3 shows a top perspective view of the corrugator glue machine of FIG. 2.

It will be understood that FIG. 2 is a side view, and that typically the glue machine 10 will have two "first" support arms 20*a* located at opposite ends of the laterally extending delivery idler roller 12, as well as two "second" support arms 20*b* located at opposite ends of the laterally extending web positioning roller 14 (see FIG. 3). In the illustrated embodiment, each of the rollers 12 and 14 is rotationally supported on a respective axially extending lateral shaft 31,32 that is supported at its opposite ends on the paired "first" support arms 20*a* or the paired "second" support arms 20*b* as shown in FIG. 3. In this embodiment, a suitable cross member 25 is provided linking both sets of the adjacent first and second support arms 20*a* and 20*b* located on either side of the glue machine 10, with each cross member 25 having suitable geometry as described above to null out web tension effects. Alternatively, the glue machine can be provided such that each of the rollers 12 and 14 is rotationally supported on a shaft that is cantilevered from a single support arm, such as the respective first and second support arms 20*a* and 20*b* shown in FIG. 2, located on only one side of the machine. In this case, a cross member 25 is provided on only one side of the machine 10 linking the first and second support arms 20*a* and 20*b*.

In FIG. 2, both the first and second support arms 20*a* and 20*b* are anchored to the base 40 of the glue machine 10 at respective pivot joints 22*a* and 22*b* located in substantially the same horizontal plane, i.e. they are at substantially the same elevation. However, this is not required. As seen in FIG. 4, it is permissible, and in some cases it is preferred, to anchor the second support arm 20*b* to the machine base 40 at a pivot joint located at an elevation different from that of the first support arm 20*a*. As evident by comparing FIG. 2 and FIG. 4, this will result in the cross member 25 having a different slope between the respective first and second linking pivot joints 26 and 27, assuming the relative positions of the rollers 12 and 14 do not change. However, so long as Eq. 7 (assuming the support arms 20*a* and 20*b* are parallel) is satisfied, the resulting mechanism will be effective to null out web tension effects so they do not cause any net force to be exerted on the positioning roller 14, and consequently they will not affect the pressure controller's ability to precisely meter the width of the gap 18 as glue is being applied to the passing flute crests 6.

Thus, it will be understood from the foregoing description that according to the invention, the geometries of the first and second support arms 20*a* and 20*b*, the cross member 25, the first and second pivot joints 22*a* and 22*b* and the first and second linking pivot joints 26 and 27, all cooperate to provide an effective web tension nulling mechanism such that web tension-effect forces on the respective idler and positioning rollers 12 and 14 are effectively canceled out. In other words, the geometry of the elements mentioned in this paragraph is selected according to the invention such that the moments acting on the first and second support arms 20*a* and 20*b*, based on the tension in the web 5 acting through contact with the rollers 12 and 14, are effectively mechanically canceled out so that their vector sum is equal or substantially equal to zero. It will be seen from the foregoing explanation that the cross member 25 dynamically links the rollers 12 and 14 in a manner so as to achieve this effect. (By "dynamically links," it is meant that the rollers 12 and 14 are linked through a series of intermediately linked machine members or elements so that their relative positions are not static; i.e. they are movable relative to one another to a degree permitted by the intermediate elements). As a result, any change in the tension of traveling web 5 will result in corresponding equal changes in the magnitudes of the oppositely acting moments in the respective first and second support arms 20*a* and 20*b*, the net effect being that these moments mechanically cancel out resulting in a net zero change in the position of the positioning roller 14 due to transient web tension effects. Consequently, the pressure controller experiences no or substantially no net forces as a result of web tension effects, which is then responsible solely for regulating the gap 18 width (and for compensating predictable roller mass-based moments).

This is especially important when changing flute sizes in the glue machine. It is important to accurately meter the width of the gap 18 and the pressure exerted by the positioning roller 14 against the flutes 6 (against applicator roller 16) to ensure the correct amount of glue is applied across different flute sizes when such different sizes are used.

The glue machine according to the invention, incorporating the above-described web tension nulling geometry, allows very precise metering of the gap 18 regardless and independent of the web tension, or of sudden changes in the web tension based on external factors beyond the scope of the glue machine.

The above description of the web tension nulling mechanism has been provided with respect to a transversely extending cross member 25 pivotally linked to first and second support arms 20*a* and 20*b*, which in turn support the idler roller 12 and web positioning roller 14. However, the nulling mechanism according to the invention is not to be correspondingly limited to this construction. For example, it is possible and contemplated that linkage systems comprising a plurality of members can be incorporated to dynamically link the idler and positioning rollers 12 and 14, or the first and second support arms 20*a* and 20*b*, so as to effectively cancel out the web tension-induced forces as described herein; the invention is not limited to a single cross member 25. Also, it will be evident to the person of ordinary skill in the art, on reading the present disclosure, that other mechanical linkages or linkage systems can be established to achieve the web tension nulling effect as described, herein, so that the controller 50 that is operatively coupled to the positioning roller 14 is shielded from web tension-induced forces during operation of the glue machine 10. It is contemplated that the present invention encompasses all such mechanical linkages and linkage systems. The constructions disclosed herein are provided to illustrate exemplary embodiments of the invention.

It is to be noted that precise gap metering control has been described above with respect to adjusting the position of the web positioning roller 14. Alternatively, it is contemplated that gap metering control can be achieved by fixing the position of the positioning roller 14 and adjusting the position of the glue roller 16. This construction, however, is less preferred because of the relative complexity associated with adjusting the position of the glue applicator roller 16 during machine operation. For example, the thickness of the glue film 4 applied to the circumferential surface of the applicator roller 16 also typically is precisely metered to achieve optimal glue application, e.g., by the methods described in U.S. Pat. No. 6,602,546 incorporated hereinabove. Thus, in order to adjust the relative position of the applicator roller 16, the relative positions of a substantial number of additional machine components also would need to be correspondingly adjusted, such as the glue tray and isobar assemblies described in that patent. For example, one method would be to incorporate all of the applicator roller-associated components onto a subassembly and to provide a rail system for translating the subassembly relative to the positioning roller 14. However, adjustment in this manner may compromise the precision of the glue film application components, as well as contribute excessive complexity and cost to the machine's manufacture. For at least these reasons, it is preferred to adjust the position of the positioning roller 14 relative to that of the applicator roller 16 whose position is fixed on a stationary rotational axis, and to mechanically cancel out web tension-induced forces acting on the positioning roller, or on any of its associated linkages, by incorporating a web tension nulling mechanism as disclosed herein.

Though the web tension nulling mechanism has been described herein with respect to its application in a corrugator glue machine 10, the basic invention can be applied to null or cancel out transient web tension effects in any processing unit or other machine that carries or operates on a traveling material web. A person of ordinary skill in the art, based on the present disclosure, will be able to adapt the teachings of this document to provide an effective web tension nulling mechanism to other such processing units or machines without undue experimentation.

Although the invention has been described with respect to certain embodiments, it will be understood that various changes or modifications can be made thereto based on the present disclosure without departing from the spirit and the scope of the invention as set forth in the appended claims.

What is claimed is:

1. A corrugator glue machine comprising an idler roller and a web positioning roller cooperating to at least partially define a serpentine web path through said machine, a position of said positioning roller being freely adjustable within a predetermined range during operation of said machine, said glue machine further comprising a web tension nulling mechanism effective to cancel out forces exerted on the web positioning roller resulting from tension in said web such that said forces do not substantially affect the position of said positioning roller within said predetermined range, said web tension nulling mechanism comprising a first support arm pivotally attached to said machine, a second support arm pivotally attached to said machine, and a cross member extending between and pivotally joined to said respective first and second support arms, said idler roller being rotationally attached to said first support arm and said positioning roller being rotationally attached to said second support arm.

2. A machine according to claim 1, said web tension nulling mechanism being effective such that said forces do not substantially affect the position of said positioning roller anywhere within said predetermined range.

3. A machine according to claim 1, said idler roller and said web positioning roller being dynamically linked in such a manner that the sum of web tension-induced forces, acting through contact of said web with said rollers, is substantially equal to zero.

4. A machine according to claim 1, said web tension nulling mechanism being effective to cancel out forces exerted on the web positioning roller resulting from tension in said web despite tension changes in the web.

5. A machine according to claim 1, a geometry of said cross member being selected to establish a mechanical equilibrium based on web tension-induced forces during operation of said glue machine, such that the sum of all moments induced on the system defined as the idler roller, the web positioning roller, the first and second support arms and the cross member, as a result of web tension, is substantially equal to zero.

6. A machine according to claim 1, said first support arm being pivotally attached to said machine at a first support pivot joint defining a first pivot axis, and said second support arm being pivotally attached to said machine at a second support pivot joint defining a second pivot axis.

7. A machine according to claim 6, wherein a first line drawn through and normal to both said first pivot axis and a rotational axis of said idler roller is parallel to a second line drawn through and normal to both said second pivot axis and an axis of rotation of said positioning roller.

8. A machine according to claim 6, wherein an axis of rotation of said positioning roller is substantially vertically aligned over said second pivot axis.

9. A machine according to claim 6, wherein an axis of rotation of said idler roller is substantially vertically aligned over said first pivot axis.

10. A machine according to claim 1, further comprising a glue applicator roller having a rotational axis that is parallel to a rotational axis of said web positioning roller, said web positioning roller and said glue applicator roller defining a gap therebetween, said serpentine web path traversing said gap around an outer circumferential surface of said positioning roller.

11. A machine according to claim 10, further comprising a pressure controller operatively linked to said web positioning roller and effective to meter the width of said gap and/or the pressure with which said web positioning roller compresses said web against said glue applicator roller during operation of said machine.

12. A machine according to claim 11, said web tension nulling mechanism being effective to substantially prevent said pressure controller from experiencing web tension-induced forces during operation of said machine.

13. A machine according to claim 1, an axis of rotation of said idler roller being located at an elevation above an axis of rotation of said positioning roller.

14. A corrugator glue machine comprising a web positioning roller for carrying a web of material over its circumferential outer surface during operation of said machine, means for adjusting the position of said web positioning roller during operation of said machine, and a web tension nulling mechanism effective to cancel out forces exerted on the web positioning roller resulting from tension in said web, such that said adjusting means experience substantially no forces resulting from web tension, said web tension nulling mechanism comprising a first support ann pivotally affached to said machine, a second support arm pivotally attached to said machine and an idler roller rotationally attached to said first support arm, said positioning roller being rotationally attached to said second support arm, said idler and positioning rollers cooperating to at least partially define a serpentine web path through said machine, said web tension nulling mechanism further comprising a cross member extending between and pivotally joined to said respective first and second support arms.

15. A machine according to claim 14, said web tension nulling mechanism being effective such that said adjusting means experience substantially no forces resulting from web tension despite changes in web tension during operation of said machine.

16. A machine according to claim 14, further comprising a glue applicator roller that is parallel to said web positioning roller, said web positioning roller and said glue applicator roller defining a gap therebetween such that a path of said web carried over the circumferential surface of said positioning roller during operation of said machine traverses said gap, said adjusting means being effective to meter the width of said gap during operation of said machine by adjusting the position of said positioning roller.

17. A machine according to claim 14, a geometry of said cross member being selected to establish a mechanical equilibrium based on web tension-induced forces during operation of said glue machine, such that the sum of all moments induced on the system defined as the idler roller, the web positioning roller, the first and second support arms and the cross member, as a result of web tension, is substantially equal to zero.

* * * * *